United States Patent
Lam et al.

(10) Patent No.: US 10,521,914 B2
(45) Date of Patent: Dec. 31, 2019

(54) MULTI-SENSOR OBJECT RECOGNITION SYSTEM AND METHOD

(71) Applicant: SYMBOL TECHNOLOGIES, LLC, Lincolnshire, IL (US)

(72) Inventors: Joseph Lam, North York (CA); Xinyi Gong, Toronto (CA)

(73) Assignee: Symbol Technologies, LLC, Holtsville, NY (US)

( * ) Notice: Subject to any disclaimer, the term of this patent is extended or adjusted under 35 U.S.C. 154(b) by 85 days.

(21) Appl. No.: 15/698,288

(22) Filed: Sep. 7, 2017

(65) Prior Publication Data
US 2019/0073775 A1 Mar. 7, 2019

(51) Int. Cl.
*G06T 7/13* (2017.01)
*G06K 9/46* (2006.01)
(Continued)

(52) U.S. Cl.
CPC ............ *G06T 7/13* (2017.01); *G06K 9/00624* (2013.01); *G06K 9/46* (2013.01); *G06T 7/136* (2017.01);
(Continued)

(58) Field of Classification Search
CPC .............. G06Q 10/087; G06K 7/1413; G06K 9/00624; G06K 9/46; G06T 2207/10028;
(Continued)

(56) References Cited

U.S. PATENT DOCUMENTS

| 5,214,615 A | 5/1993 | Bauer |
| 5,408,322 A | 4/1995 | Hsu et al. |

(Continued)

FOREIGN PATENT DOCUMENTS

| CA | 2835830 | 11/2012 |
| CA | 3028156 | 1/2018 |

(Continued)

OTHER PUBLICATIONS

United Kingdom Intellectual Property Office, "Combined Search and Examination Report" for GB Patent Application No. 1813580.6 dated Feb. 21, 2019.

(Continued)

*Primary Examiner* — Daniel G Mariam

(57) ABSTRACT

A method of object detection includes obtaining a set of images depicting overlapping regions of an area containing a plurality of objects. Each image includes input object indicators defined by input bounding boxes, input confidence level values, and object identifiers. The method includes identifying candidate subsets of input object indicators in adjacent images. Each candidate subset has input overlapping bounding boxes in a common frame of reference, and a common object identifier. The method includes adjusting the input confidence levels for each input object indicator in the candidate subsets; selecting clusters of the input object indicators satisfying a minimum input confidence threshold, having a common object identifier, and having a degree of overlap satisfying a predefined threshold; and detecting an object by generating a single output object indicator for each cluster, the output object indicator having an output bounding box, an output confidence level value, and the common object identifier.

19 Claims, 10 Drawing Sheets

US 10,521,914 B2

Page 2

(51) Int. Cl.
G06K 9/00 (2006.01)
G06T 7/136 (2017.01)

(52) U.S. Cl.
CPC ............. G06T 2207/10028 (2013.01); G06T 2207/30241 (2013.01)

(58) Field of Classification Search
CPC .. G06T 2207/30241; G06T 7/13; G06T 7/136
USPC .................................................. 382/190, 225
See application file for complete search history.

(56) References Cited

U.S. PATENT DOCUMENTS

| | | | |
|---|---|---|---|
| 5,414,268 A | 5/1995 | McGee | |
| 5,534,762 A | 7/1996 | Kim | |
| 5,566,280 A | 10/1996 | Fukui et al. | |
| 5,953,055 A | 9/1999 | Huang et al. | |
| 5,988,862 A | 11/1999 | Kacyra et al. | |
| 6,026,376 A | 2/2000 | Kenney | |
| 6,034,379 A | 3/2000 | Bunte et al. | |
| 6,075,905 A | 6/2000 | Herman et al. | |
| 6,115,114 A | 9/2000 | Berg et al. | |
| 6,141,293 A | 10/2000 | Amorai-Moriya et al. | |
| 6,304,855 B1 | 10/2001 | Burke | |
| 6,442,507 B1 | 8/2002 | Skidmore et al. | |
| 6,580,441 B2 | 6/2003 | Schileru-Key | |
| 6,711,293 B1 | 3/2004 | Lowe | |
| 6,721,769 B1 | 4/2004 | Rappaport et al. | |
| 6,836,567 B1 | 12/2004 | Silver et al. | |
| 6,995,762 B1 | 2/2006 | Pavlidis et al. | |
| 7,090,135 B2 | 8/2006 | Patel | |
| 7,137,207 B2 | 11/2006 | Armstrong et al. | |
| 7,245,558 B2 | 7/2007 | Willins et al. | |
| 7,248,754 B2 | 7/2007 | Cato | |
| 7,277,187 B2 | 10/2007 | Smith et al. | |
| 7,373,722 B2 | 5/2008 | Cooper et al. | |
| 7,474,389 B2 | 1/2009 | Greenberg et al. | |
| 7,487,595 B2 | 2/2009 | Armstrong et al. | |
| 7,493,336 B2 | 2/2009 | Noonan | |
| 7,527,205 B2 | 5/2009 | Zhu et al. | |
| 7,605,817 B2 | 10/2009 | Zhang et al. | |
| 7,647,752 B2 | 1/2010 | Magnell | |
| 7,693,757 B2 | 4/2010 | Zimmerman | |
| 7,726,575 B2 | 6/2010 | Wang et al. | |
| 7,839,531 B2 | 11/2010 | Sugiyama | |
| 7,845,560 B2 | 12/2010 | Emanuel et al. | |
| 7,885,865 B2 | 2/2011 | Benson et al. | |
| 7,925,114 B2 | 4/2011 | Mai et al. | |
| 7,957,998 B2 | 6/2011 | Riley et al. | |
| 8,009,864 B2 | 8/2011 | Linaker et al. | |
| 8,049,621 B1 | 11/2011 | Egan | |
| 8,091,782 B2 | 1/2012 | Cato et al. | |
| 8,094,902 B2 | 1/2012 | Crandall et al. | |
| 8,094,937 B2 | 1/2012 | Teoh et al. | |
| 8,132,728 B2 | 3/2012 | Dwinell et al. | |
| 8,134,717 B2 | 3/2012 | Pangrazio et al. | |
| 8,189,855 B2 | 5/2012 | Opalach et al. | |
| 8,199,977 B2 | 6/2012 | Krishnaswamy et al. | |
| 8,207,964 B1 | 6/2012 | Meadow et al. | |
| 8,233,055 B2 | 7/2012 | Matsunaga et al. | |
| 8,265,895 B2 | 9/2012 | Willins et al. | |
| 8,284,988 B2 | 10/2012 | Sones et al. | |
| 8,423,431 B1 | 4/2013 | Rouaix et al. | |
| 8,429,004 B2 | 4/2013 | Hamilton et al. | |
| 8,463,079 B2 | 6/2013 | Ackley et al. | |
| 8,479,996 B2 | 7/2013 | Barkan et al. | |
| 8,520,067 B2 | 8/2013 | Ersue | |
| 8,542,252 B2 | 9/2013 | Perez et al. | |
| 8,599,303 B2 | 12/2013 | Stettner | |
| 8,630,924 B2 | 1/2014 | Groenevelt et al. | |
| 8,660,338 B2 | 2/2014 | Ma et al. | |
| 8,743,176 B2 | 6/2014 | Stettner et al. | |
| 8,757,479 B2 | 6/2014 | Clark et al. | |
| 8,812,226 B2 | 8/2014 | Zeng | |
| 8,923,893 B2 | 12/2014 | Austin et al. | |
| 8,939,369 B2 | 1/2015 | Olmstead et al. | |
| 8,954,188 B2 | 2/2015 | Sullivan et al. | |
| 8,971,637 B1 | 3/2015 | Rivard | |
| 8,989,342 B2 | 3/2015 | Liesenfelt et al. | |
| 9,007,601 B2 | 4/2015 | Steffey et al. | |
| 9,064,394 B1 | 6/2015 | Trundle | |
| 9,070,285 B1 | 6/2015 | Ramu et al. | |
| 9,129,277 B2 | 9/2015 | Macintosh | |
| 9,135,491 B2 | 9/2015 | Morandi et al. | |
| 9,159,047 B2 | 10/2015 | Winkel | |
| 9,171,442 B2 | 10/2015 | Clements | |
| 9,329,269 B2 | 5/2016 | Zeng | |
| 9,349,076 B1 | 5/2016 | Liu et al. | |
| 9,367,831 B1 | 6/2016 | Besehanic | |
| 9,380,222 B2 | 6/2016 | Clayton et al. | |
| 9,396,554 B2 | 7/2016 | Williams et al. | |
| 9,400,170 B2 | 7/2016 | Steffey | |
| 9,424,482 B2 | 8/2016 | Patel et al. | |
| 9,549,125 B1 | 1/2017 | Goyal et al. | |
| 9,562,971 B2 | 2/2017 | Shenkar et al. | |
| 9,565,400 B1 | 2/2017 | Curlander et al. | |
| 9,600,731 B2 * | 3/2017 | Yasunaga | G06K 9/325 |
| 9,600,892 B2 | 3/2017 | Patel et al. | |
| 9,639,935 B1 | 5/2017 | Douady-Pleven et al. | |
| 9,697,429 B2 | 7/2017 | Patel et al. | |
| 9,778,388 B1 | 10/2017 | Connor | |
| 9,791,862 B1 | 10/2017 | Connor | |
| 9,805,240 B1 | 10/2017 | Zheng et al. | |
| 9,811,754 B2 | 11/2017 | Schwartz | |
| 9,827,683 B1 * | 11/2017 | Hance | B25J 9/162 |
| 9,928,708 B2 | 3/2018 | Lin et al. | |
| 10,019,803 B2 | 7/2018 | Venable et al. | |
| 10,127,438 B1 | 11/2018 | Fisher et al. | |
| 10,229,386 B2 * | 3/2019 | Thomas | G06Q 10/087 |
| 10,265,871 B2 * | 4/2019 | Hance | B25J 19/021 |
| 2001/0041948 A1 | 11/2001 | Ross et al. | |
| 2002/0006231 A1 | 1/2002 | Jayant et al. | |
| 2002/0097439 A1 | 7/2002 | Braica | |
| 2002/0158453 A1 | 10/2002 | Levine | |
| 2002/0164236 A1 | 11/2002 | Fukuhara et al. | |
| 2003/0003925 A1 | 1/2003 | Suzuki | |
| 2003/0174891 A1 | 9/2003 | Wenzel et al. | |
| 2004/0131278 A1 | 7/2004 | Imagawa et al. | |
| 2004/0240754 A1 | 12/2004 | Smith et al. | |
| 2005/0016004 A1 | 1/2005 | Armstrong et al. | |
| 2005/0114059 A1 | 5/2005 | Chang et al. | |
| 2005/0213082 A1 | 9/2005 | DiBernardo et al. | |
| 2005/0213109 A1 | 9/2005 | Schell et al. | |
| 2006/0032915 A1 | 2/2006 | Schwartz | |
| 2006/0045325 A1 | 3/2006 | Zavadsky et al. | |
| 2006/0106742 A1 | 5/2006 | Bochicchio et al. | |
| 2007/0074410 A1 | 4/2007 | Armstrong et al. | |
| 2007/0272732 A1 | 11/2007 | Hindmon | |
| 2008/0025565 A1 | 1/2008 | Zhang et al. | |
| 2008/0159634 A1 | 7/2008 | Sharma et al. | |
| 2008/0164310 A1 | 7/2008 | Dupuy et al. | |
| 2008/0175513 A1 | 7/2008 | Lai et al. | |
| 2008/0181529 A1 | 7/2008 | Michel et al. | |
| 2008/0238919 A1 | 10/2008 | Pack | |
| 2008/0294487 A1 | 11/2008 | Nasser | |
| 2009/0009123 A1 | 1/2009 | Skaff | |
| 2009/0024353 A1 | 1/2009 | Lee et al. | |
| 2009/0057411 A1 | 3/2009 | Madej et al. | |
| 2009/0059270 A1 | 3/2009 | Opalach et al. | |
| 2009/0060349 A1 | 3/2009 | Linaker et al. | |
| 2009/0063306 A1 | 3/2009 | Fano et al. | |
| 2009/0063307 A1 | 3/2009 | Groenovelt et al. | |
| 2009/0074303 A1 | 3/2009 | Filimonova et al. | |
| 2009/0088975 A1 | 4/2009 | Sato et al. | |
| 2009/0103773 A1 | 4/2009 | Wheeler et al. | |
| 2009/0125350 A1 | 5/2009 | Lessing et al. | |
| 2009/0125535 A1 | 5/2009 | Basso et al. | |
| 2009/0152391 A1 | 6/2009 | McWhirk | |
| 2009/0160975 A1 | 6/2009 | Kwan | |
| 2009/0192921 A1 | 7/2009 | Hicks | |
| 2009/0206161 A1 | 8/2009 | Olmstead | |
| 2009/0236155 A1 | 9/2009 | Skaff | |
| 2009/0252437 A1 | 10/2009 | Li et al. | |
| 2009/0323121 A1 | 12/2009 | Valkenburg et al. | |

(56) References Cited

U.S. PATENT DOCUMENTS

| | | |
|---|---|---|
| 2010/0026804 A1 | 2/2010 | Tanizaki et al. |
| 2010/0070365 A1 | 3/2010 | Siotia et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volmann et al. |
| 2012/0075342 A1 | 3/2012 | Choubassi et al. |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Showering |
| 2014/0104413 A1 | 4/2014 | McCloskey et al. |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0262116 A1 | 9/2015 | Katircioglu et al. |
| 2015/0298317 A1 | 10/2015 | Wang et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171707 A1* | 6/2016 | Schwartz ............ G06K 9/00201 |
| | | 382/180 |
| 2016/0191759 A1 | 6/2016 | Somanath et al. |
| 2016/0253735 A1 | 9/2016 | Scudillo et al. |
| 2016/0328618 A1 | 11/2016 | Patel et al. |
| 2016/0353099 A1 | 12/2016 | Thomson et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0066459 A1 | 3/2017 | Singh |
| 2017/0074659 A1 | 3/2017 | Giurgiu et al. |
| 2017/0150129 A1 | 5/2017 | Pangrazio |
| 2017/0193434 A1 | 7/2017 | Shah et al. |
| 2017/0219338 A1 | 8/2017 | Brown et al. |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0280125 A1 | 9/2017 | Brown et al. |
| 2017/0286773 A1* | 10/2017 | Skaff .................... G06Q 10/087 |
| 2017/0286901 A1* | 10/2017 | Skaff .................... G06Q 10/087 |
| 2017/0323376 A1 | 11/2017 | Glaser et al. |
| 2018/0001481 A1 | 1/2018 | Shah et al. |
| 2018/0005035 A1 | 1/2018 | Bogolea et al. |
| 2018/0005176 A1* | 1/2018 | Williams ............ G06Q 10/087 |
| 2018/0020145 A1 | 1/2018 | Kotfis et al. |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0114183 A1 | 4/2018 | Howell |
| 2018/0143003 A1 | 5/2018 | Clayton et al. |
| 2018/0174325 A1 | 6/2018 | Fu et al. |

(56) References Cited

U.S. PATENT DOCUMENTS

| | | |
|---|---|---|
| 2018/0204111 A1 | 7/2018 | Zadeh et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0180150 A1 | 6/2019 | Taylor et al. |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | 2003002935 | 1/2003 |
| WO | 2003025805 | 3/2003 |
| WO | 2006136958 | 12/2006 |
| WO | 2007042251 | 4/2007 |
| WO | 2008057504 | 5/2008 |
| WO | 2008154611 | 12/2008 |
| WO | 2012103199 | 8/2012 |
| WO | 2012103202 | 8/2012 |
| WO | 2012154801 | 11/2012 |
| WO | 2013165674 | 11/2013 |
| WO | 2014066422 | 5/2014 |
| WO | 2014092552 | 6/2014 |
| WO | 2014181323 | 11/2014 |
| WO | 2015127503 | 9/2015 |
| WO | 2016020038 | 2/2016 |
| WO | 2018018007 | 1/2018 |
| WO | 2019023249 | 1/2019 |

OTHER PUBLICATIONS

United Kingdom Intellectual Property Office, Combined Search and Examination Report dated Jan. 22, 2016 for GB Patent Application No. 1417218.3.

United Kingdom Intellectual Property Office, Combined Search and Examination Report dated Jan. 22, 2016 for GB Patent Application No. 1521272.3.

United Kingdom Intellectual Property Office, Combined Search and Examination Report dated Mar. 11, 2015 for GB Patent Application No. 1417218.3.

Varol Gul et al: "Product placement detection based on image processing", 2014 22nd Signal Processing and Communication Applications Conference (SIU), IEEE, Apr. 23, 2014.

Varol Gul et al: "Toward Retail product recognition on Grocery shelves", Visual Communications and image processing; Jan. 20, 2004; San Jose, (Mar. 4, 2015).

Weber et al., "Methods for Feature Detection in Point clouds," visualization of large and unstructured data sets—IRTG Workshop, pp. 90-99 (2010).

Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).

Ziang Xie et al., "Multimodal Blending for High-Accuracy Instance Recognition", 2013 IEEE RSJ International Conference on Intelligent Robots and Systems, p. 2214-2221.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bristow et al., "A Survey of Iterative Learning Control", IEEE Control Systems, Jun. 2006, pp. 96-114.

Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.

Cook et al., "Distributed Ray Tracing" ACM SIGGRAPH Computer Graphics, vol. 18, No. 3, ACM pp. 137-145, 1984.

Deschaud, et al., "A Fast and Accurate Place Detection Algorithm for Large Noisy Point Clouds Using Filtered Normals and Voxel Growing," 3DPVT, May 2010, Paris, France. [hal-01097361].

Glassner, "Space Subdivision for Fast Ray Tracing." IEEE Computer Graphics and Applications, 4.10, pp. 15-24, 1984.

Hackel et al., "Contour Detection in Unstructured 3D Point Clouds,"IEEE, 2016 Conference on Computer Vision and Pattern Recognition (CVPR), Jun. 27-30, 2016, pp. 1-9.

Hao et al., "Structure-Based Object Detection from Scene Point Clouds," Science Direct, v191, pp. 148-160 (2016).

Hu et al., "An Improved Method of Discrete Point Cloud Filtering Based on Complex Environment," International Journal of Applied Mathematics and Statistics, v48, i18 (2013).

International Search Report and Written Opinion for International Application No. PCT/US2019/025859 dated Jul. 3, 2019.

Jadhav et al. "Survey on Spatial Domain dynamic template matching technique for scanning linear barcode," International Journal of science and research v 5 n 3 (Mar. 2016).

Jian Fan et al: "Shelf detection via vanishing point and radial projection", 2014 IEEE International Conference on image processing (ICIP), IEEE, (Oct. 27, 2014), pp. 1575-1578.

Kang et al., "Kinematic Path-Tracking of Mobile Robot Using Iterative learning Control", Journal of Robotic Systems, 2005, pp. 111-121.

Kay et al. "Ray Tracing Complex Scenes" ACM SIGGRAPH Computer Graphics, vol. 20, No. 4, ACM, pp. 269-278, 1986.

Kelly et al., "Reactive Nonholonoic Trajectory Generation via Parametric Optimal Control", International Journal of Robotics Research, vot. 22, No. 7-8, pp. 583-601 (Jul. 30, 2013).

Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.

Lecking et al: "Localization in a wide range of industrial environments using relative 3D ceiling features", IEEE, pp. 333-337 (Sep. 15, 2008).

Lee et al. "Statistically Optimized Sampling for Distributed Ray Tracing." ACM SIGGRAPH Computer Graphics, vol. 19, No. 3, ACM, pp. 61-67, 1985.

Li et al., "An improved RANSAC for 3D Point cloud plane segmentation based on normal distribution transformation cells," Remote sensing, V9: 433, pp. 1-16 (2017).

Likhachev, Maxim, and Dave Ferguson, "Planning Long dynamically feasible maneuvers for autonomous vehicles." The international journal of Robotics Reasearch 28.8 (2009): 933-945 (2009).

Marder-Eppstein et al., "The Office Marathon: robust navigation in an indoor office environment," IEEE, 2010 International conference on robotics and automation, May 3-7, 2010, pp. 300-307.

(56) References Cited

OTHER PUBLICATIONS

McNaughton, Matthew, et al. "Motion planning for autonomous driving with a conformal spatiotemporal lattice." Robotics and Automation (ICRA), 2011 IEEE International Conference on. IEEE, 2011 (2011).
Mitra et al., "Estimating surface normals in noisy point cloud data," International Journal of Computational geometry & applications, Jun. 8-10, 2003, pp. 322-328.
N.D.F. Campbell et al., "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norrlof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F. et al., "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passive RFID in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10) (Oct. 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhacement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," In IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
Tseng et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Boehm, "Multi-Image Fusion for Occlusion-Free Façade Texturing", International Archives of the Photogrammetry, Remote Sensing and Spatial Information Sciences, pp. 867-872 (Jan. 2004).
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Datta, A., et al. "Accurate camera calibration using iterative refinement of control points," in Computer Vision Workshops (ICCV Workshops), 2009.
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, 25-27, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5) p. 176-178).
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Golovinskiy, Aleksey, et al. "Min-Cut based segmentation of point clouds." Computer Vision Workshops (ICCV Workshops), 2009 IEEE 12th International Conference on. IEEE, 2009.
International Patent Application Serial No. PCT/CN2017/083143 filed May 5, 2017.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion from International Patent Application No. PCT/US2018/030345 dated Sep. 17, 2018.

(56) References Cited

OTHER PUBLICATIONS

International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2013/053212 dated Dec. 1, 2014.
International Search Report and Written Opinion from International Patent Application No. PCT/US2013/070996 dated Apr. 2, 2014.

* cited by examiner

MULTI-SENSOR OBJECT RECOGNITION SYSTEM AND METHOD

BACKGROUND

Environments in which inventories of objects are managed, such as products for purchase in a retail facility, may be complex and fluid. For example, a given environment may contain a wide variety of objects with different attributes (size, shape, color and the like). Further, the placement and quantity of the objects in the environment may change frequently. Still further, imaging conditions such as lighting may be variable both over time and at different locations in the environment. These factors may reduce the accuracy with which information concerning the objects may be derived from image data captured within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
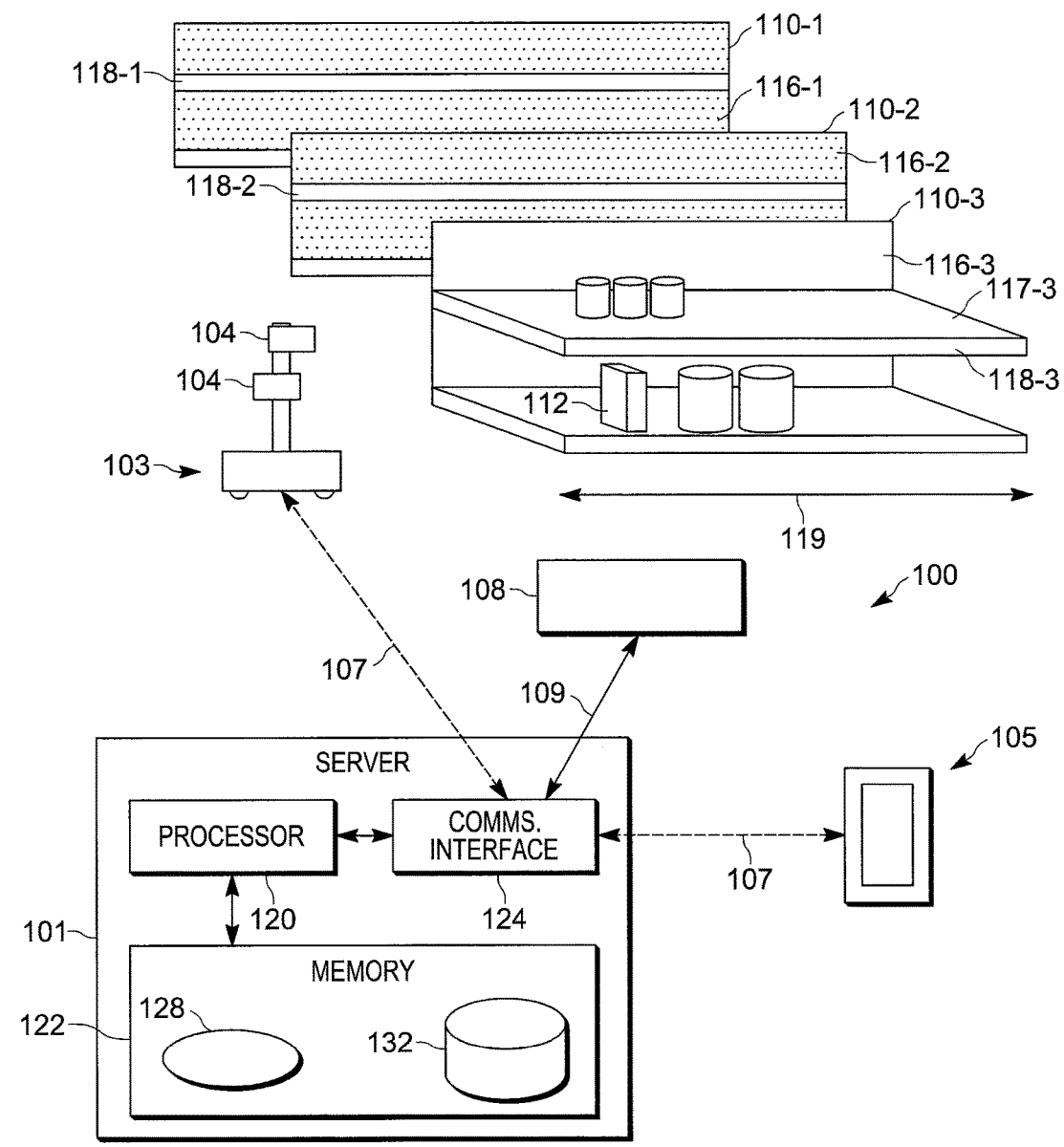
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Implementing autonomous or semi-autonomous inventory management in certain environments, such as retail facilities, warehouses and the like, presents various challenges, among which is the scale of the facility and the structures upon which the objects (e.g. products for purchase in a retail facility) are disposed. For example, a mobile apparatus may be configured to travel the facility and capture images of the objects for downstream processing to identify the objects and derive status information corresponding to the objects. Such a mobile apparatus may be equipped with an image sensor, such as a digital camera. However, an image sensor and corresponding optics to enable the apparatus to capture an image of, for example, the entire height of a shelf module in a retail facility, may be costly or simply unavailable.

The mobile apparatus may instead carry a set of image sensors disposed to capture adjacent regions, such as portions of the above-mentioned shelf module. Although this approach may mitigate the challenges associated with providing appropriate image sensing equipment, the resulting plurality of images may depict the same regions of the facility in multiple images. Further, some objects may not be fully depicted in any given image, instead being partially depicted in two or more images. The partial depiction of objects between images, and the duplicated depiction of objects in images, may reduce the accuracy with which objects may be identified, as well as the accuracy with which status information may be derived from object identification results.

Examples disclosed herein are directed to a method of object detection in an imaging controller. The method includes obtaining a set of images depicting overlapping regions of an area containing a plurality of objects. Each of the set of images includes a plurality of input object indicators defined by respective (i) input bounding boxes, (ii) input confidence level values, and (iii) object identifiers. The method further includes identifying candidate subsets of input object indicators in adjacent ones of the set of images. Each candidate subset has input bounding boxes that overlap in a common frame of reference, and a common object identifier. The method further includes adjusting the input confidence level values upwards for each input object indicator in the candidate subsets; selecting clusters of the input object indicators, the input object indicators of each cluster satisfying a minimum input confidence threshold, having a common object identifier, and having a degree of overlap that satisfies a predefined threshold; and detecting an object by generating a single output object indicator for each cluster, the output object indicator having (i) an output bounding box, (ii) an output confidence level value, and (iii) the common object identifier.

Further examples disclosed herein are directed to a computing device for detecting objects, the computing device comprising: a memory; an imaging controller comprising: an image preprocessor configured to obtain a set of images from the memory depicting overlapping regions of an area containing a plurality of objects; each of the set of images including a plurality of input object indicators defined by respective (i) input bounding boxes, (ii) input confidence level values, and (iii) object identifiers; a subset detector configured to identify candidate subsets of input object indicators in adjacent ones of the set of images, each candidate subset having input bounding boxes that overlap in a common frame of reference, and a common object identifier; the subset detector further configured to adjust the input confidence level values upwards for each input object indicator in the candidate subsets; a cluster detector configured to select clusters of the input object indicators, the input object indicators of each cluster satisfying a minimum input confidence threshold, having a common object identifier, and having a degree of overlap that satisfies a predefined threshold; and an output generator configured to detect an object by generating a single output object indicator for each cluster, the output object indicator having (i) an output bounding box, (ii) an output confidence level value, and (iii) the common object identifier.

Still further examples disclosed herein are directed to a non-transitory computer readable storage medium containing a plurality of computer readable instructions executable by an imaging controller to configure the imaging controller to perform a method of object detection comprising: obtaining a set of images depicting overlapping regions of an area containing a plurality of objects; each of the set of images including a plurality of input object indicators defined by respective (i) input bounding boxes, (ii) input confidence level values, and (iii) object identifiers; identifying candidate subsets of input object indicators in adjacent ones of the set of images, each candidate subset having input bounding boxes that overlap in a common frame of reference, and a common object identifier; adjusting the input confidence level values upwards for each input object indicator in the candidate subsets; selecting clusters of the input object indicators, the input object indicators of each cluster satisfying a minimum input confidence threshold, having a common object identifier, and having a degree of overlap that satisfies a predefined threshold; and detecting an object by generating a single output object indicator for each cluster, the output object indicator having (i) an output bounding box, (ii) an output confidence level value, and (iii) the common object identifier.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points. In other examples, the server 101, the client device 105, or both, are located outside the retail environment, and the links 107 therefore include wide-area networks such as the Internet, mobile networks, and the like. As will be described in greater detail below, the system 100 also includes a dock 108 for the apparatus 103. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 includes computing devices such as a desktop computer, a laptop computer, another server, a kiosk, a monitor, or other suitable device. The system 100 can include a plurality of client devices 105, each in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. The shelf modules 110 are typically arranged in a plurality of aisles, each of which includes a plurality of modules aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

More specifically, the apparatus 103 is deployed within the retail environment, and communicates with the server 101 (via the link 107) to navigate, autonomously or partially autonomously, the length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light), and is further configured to employ the sensors to capture shelf data. In the present example, the apparatus 103 is configured to capture, at each of a plurality of positions along the length 119 of a shelf 110, a set of images depicting the shelf 110. As will be described below in greater detail, the apparatus 103 is configured such that each set of images depicts overlapping regions of an area of the shelf 110. As the apparatus 103 moves along the length 119, another set of images is captured, depicting overlapping regions of an adjacent area. In other words, in the present example, the apparatus 103 is configured, e.g. via cameras with fields of view spaced apart vertically, to capture sets of images depicting adjacent substantially vertical segments of each shelf 110.

The server 101 includes a special purpose imaging controller, such as a processor 120, specifically designed to control the mobile automation apparatus 103 to capture data (e.g. the above-mentioned image sets), obtain the captured data via a communications interface 124 and store the captured data in a repository 132 in a memory 122. The server 101 is further configured to perform various post-processing operations on the captured data to obtain and refine object identifications from the captured data. The post-processing of captured data by the server 101 will be discussed below in greater detail. The server 101 may also be configured to determine product status data based in part on the above-mentioned product identifications, and to transmit status notifications (e.g. notifications indicating that products are out-of-stock, low stock or misplaced) to the mobile device 105 responsive to the determination of product status data.

The processor 120 is interconnected with a non-transitory computer readable storage medium, such as the above-mentioned memory 122, having stored thereon computer readable instructions for executing control of the apparatus 103 to capture data, as well as the above-mentioned post-processing functionality, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the object identification refinement discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103. The client device 105 also includes one or more controllers or processors and/or FPGAs, in communication with the controller 120, specifically configured to process (e.g. to display) notifications received from the server 101.

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more Application-Specific Integrated Circuits (ASICs)) rather than by execution of the control application 128 by the processor 120.

Figures 2A, 2B:
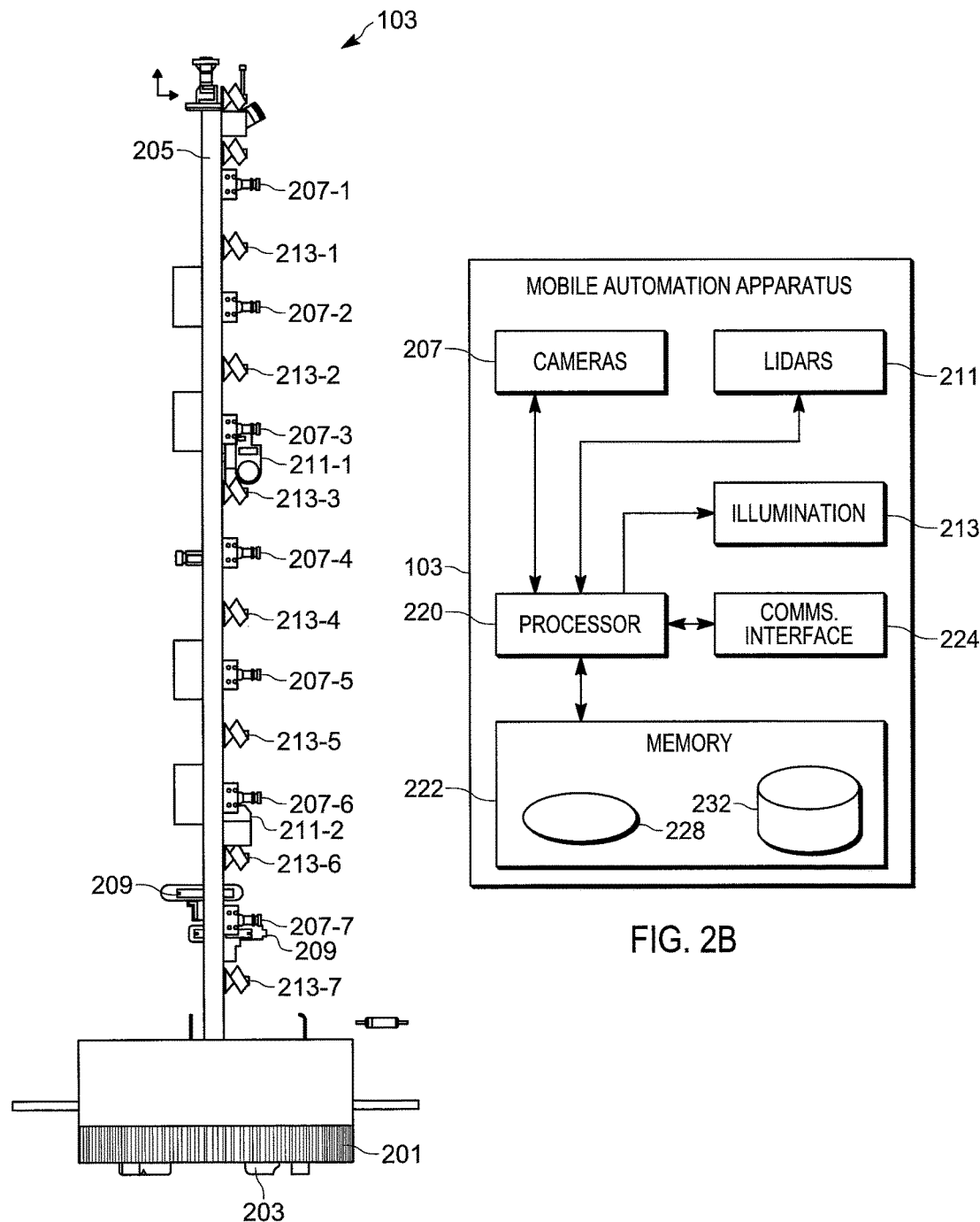
FIG. 2A depicts a mobile automation apparatus in the system of FIG. 1.
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth-sensing sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in a common frame of reference previously established in the retail facility, permitting data captured by the mobile automation apparatus 103 to be registered to the common frame of reference.

To that end, the mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions related to the navigation of the apparatus 103 (e.g. by controlling the locomotive mechanism 203) and to the detection of objects in data captured by the sensors (e.g. the cameras 207). The application 228 may also be implemented as a suite of distinct applications in other examples.

The processor 220, when so configured by the execution of the application 228, may also be referred to as a controller 220 or, in the context of object detection from captured data, as an imaging controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to initiate data capture operations, via a communications interface 224 over the link 107 shown in FIG. 1. The communications interface 224 also enables the apparatus 103 to communicate with the server 101 via the dock 108 and the link 109.

In the present example, as discussed below, one or both of the server 101 (as configured via the execution of the control application 128 by the processor 120) and the mobile automation apparatus 103 (as configured via the execution of the application 228 by the processor 220), are configured to process images captured by the apparatus 103 to obtain and refine object identifications therefrom. In further examples, the data processing discussed below may be performed on a computing device other than the server 101 and the mobile automation apparatus 103, such as the client device 105. The data processing mentioned above will be described in greater detail in connection with its performance at the server 101, via execution of the application 128.

Figure 2C:
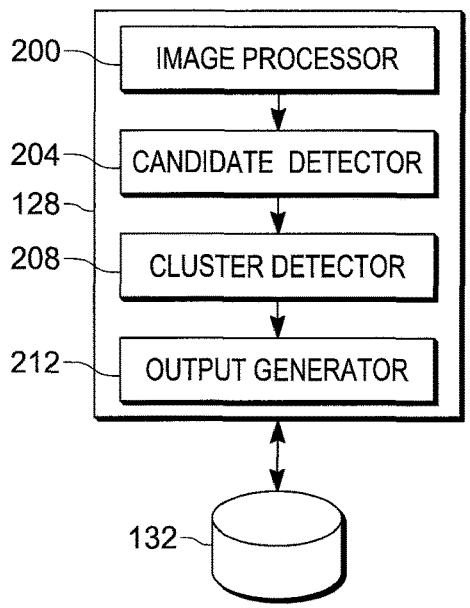
FIG. 2C is a block diagram of certain internal hardware components of the server in the system of FIG. 1.

Turning now to FIG. 2C, before describing the operation of the application 128 to obtain and refine object identifications, certain components of the application 128 will be described in greater detail. As will be apparent to those skilled in the art, in other examples the components of the application 128 may be separated into distinct applications, or combined into other sets of components. Some or all of the components illustrated in FIG. 2C may also be implemented as dedicated hardware components, such as one or more ASICs or FPGAs. For example, in one embodiment, to improve reliability and processing speed, at least some of the components of FIG. 2C are programmed directly into the imaging controller 120, which may be an FPGA or an ASIC having circuit and memory configuration specifically designed to optimize image processing of a high volume of sensor data received from the mobile automation apparatus 103. In such an embodiment, some or all of the control application 128, discussed below, is an FPGA or an ASIC chip.

The control application 128 includes an image preprocessor 200 configured to obtain sets of images depicting the shelves 110 and the products 112 supported thereon, and to obtain (e.g. embedded in or included with the images) input object indicators corresponding to the products 112. The preprocessor 200 is also configured to register the above-mentioned images to a common frame of reference, such as a coordinate system established within the retail facility. The control application 128 also includes a candidate detector 204 configured to select candidate subsets of object indicators (e.g., object indicators likely to correspond to products 112, rather than to be false detections of products) in adjacent images among a set of the images. A cluster detector 208 is configured to select clusters of the input object indicators that likely depict the same product 112, and an output generator 212 is configured to generate output object indicators—corresponding to object indicators assessed as being sufficiently likely to depict products 112 on the shelf 110—from the clusters.

Figure 3:
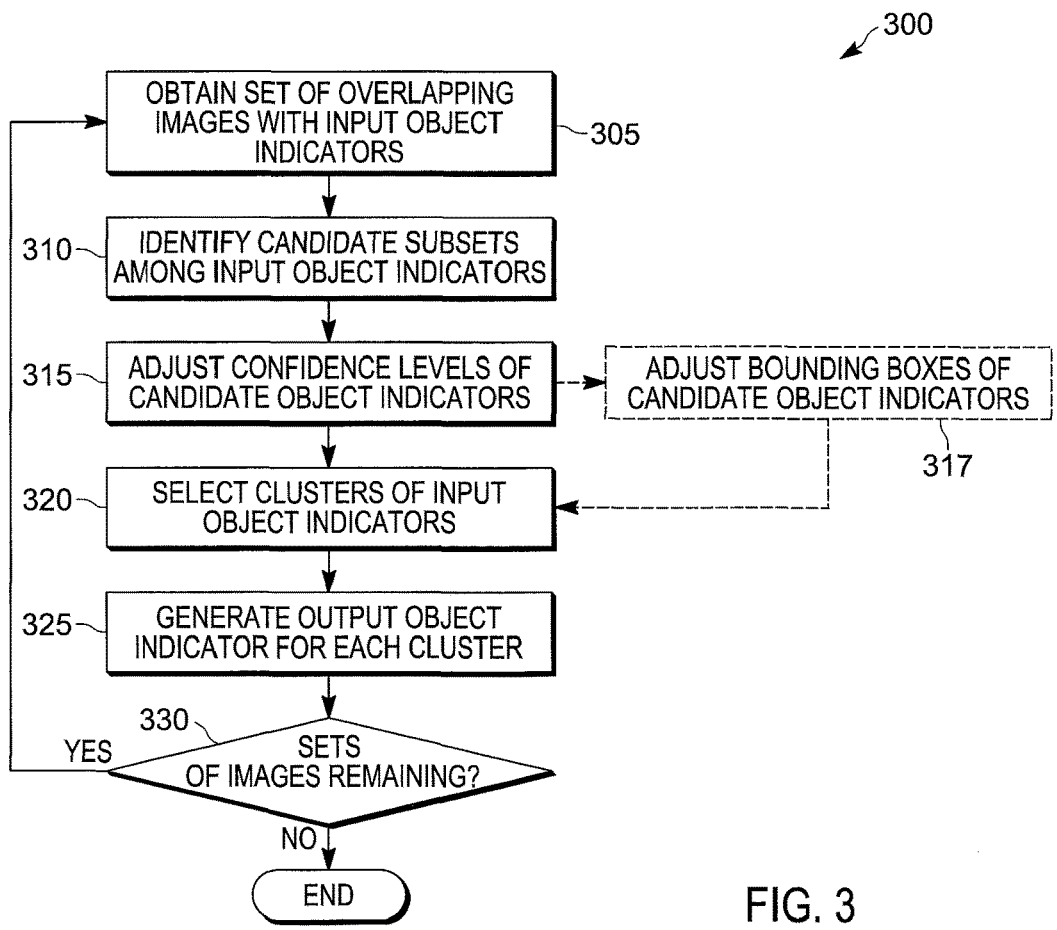
FIG. 3 is a flowchart of a method of support surface edge detection.

The functionality of the control application 128 will now be described in greater detail. Turning to FIG. 3, a method 300 of object detection is shown. The method 300 will be described in conjunction with its performance on the system 100 and with reference to the components illustrated in FIG. 2C. As noted earlier, additionally, in other examples, some or all of the method 300 is performed by the components illustrated in FIG. 2B.

At block 305, the controller 120, and in particular the preprocessor 200, is configured to obtain a set of images depicting overlapping regions of an area containing a plurality of objects. The images obtained at block 305 are, for example, captured by the apparatus 103 and stored in the repository 132. The preprocessor 200 is therefore configured, in the above example, to obtain the image by retrieving the image from the repository 132. The process of obtaining the images at block 305 can also, in some embodiments, include the transmission of instructions to the apparatus 103 to capture the images.

Figure 4A:
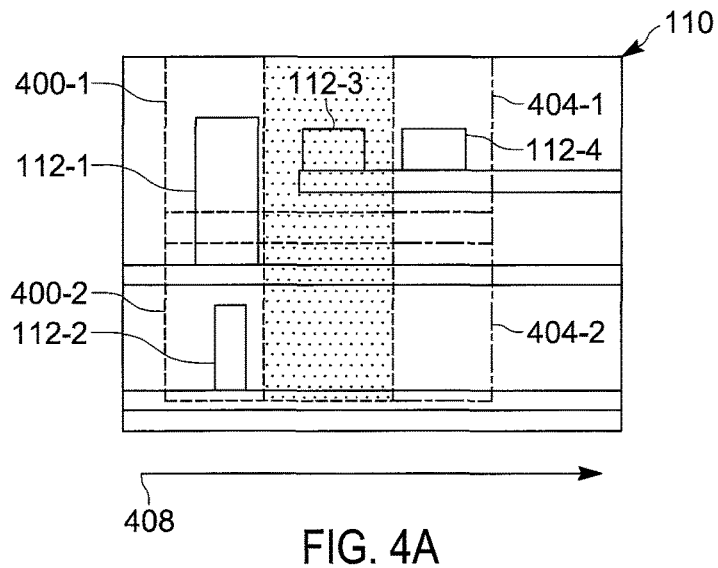
FIGS. 4A-4B depict example images and input object indicators obtained in the performance of the method of FIG. 3.
Figure 4B:
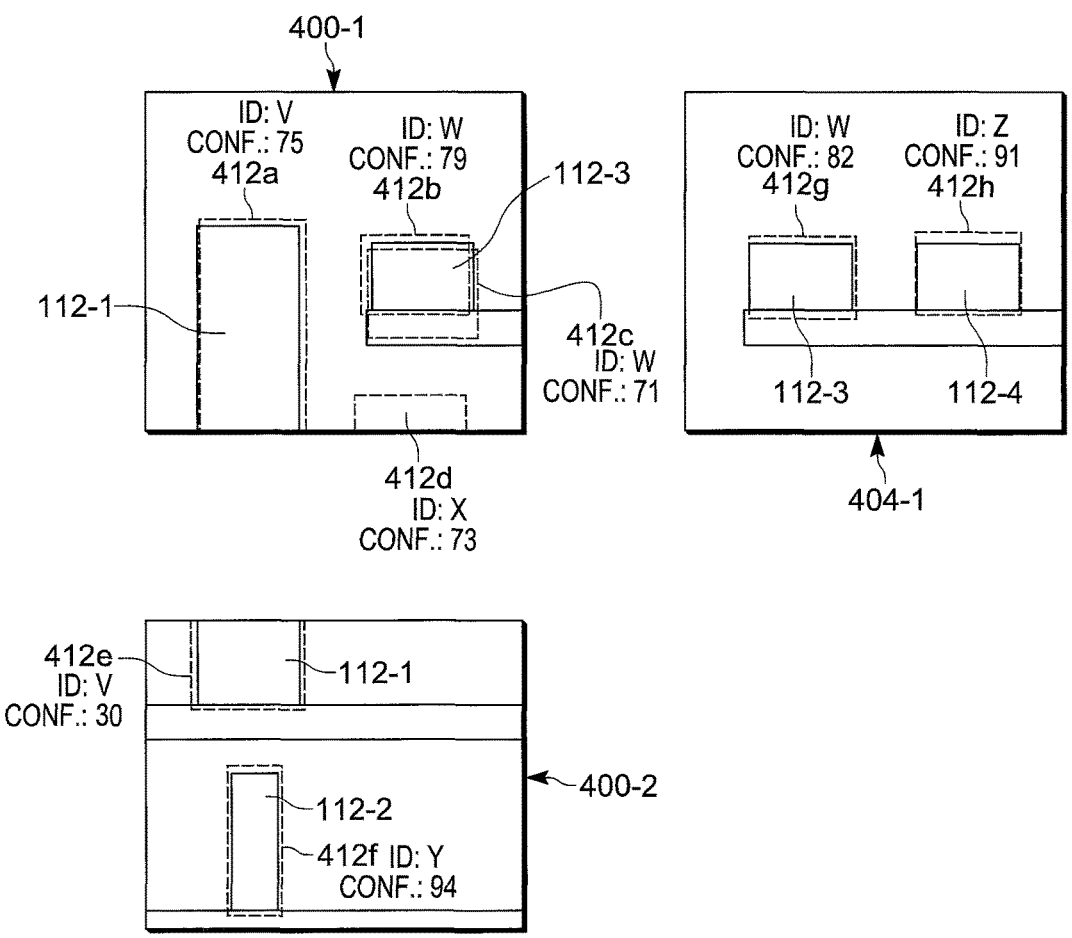

FIGS. 4A and 4B depict example sets of images. In particular, a first set of images 400-1 and 400-2 (which may therefore also be referred to as a set 400 of images) and a second set of images 404-1 and 404-2 (which may therefore also be referred to as a set 404 of images) are shown overlaid on a shelf module 110 to indicate the areas of the shelf 110 that each image depicts. As shown in FIG. 4A, the images of the set 400 depict overlapping regions of a first area of the shelf 110, and the images of the set 404 depict overlapping regions of a second area of the shelf 110. The first and second areas themselves also overlap, as will be discussed in greater detail below.

More specifically, in the present example, the images within a given set (e.g., the images 400-1 and 400-2) depict regions of the shelf 110 that overlap in a direction substantially perpendicular to a direction of travel 408 of the apparatus 103 as the apparatus 103 travels along the shelf module 110 during image capture. The images of sequential sets, meanwhile, depict areas of the shelf 110 that are adjacent to each other, and in the present example overlap, in a direction substantially parallel to the direction of travel 408. Thus, in the present example, the images 400-1 and 400-2 overlap vertically, and the images 404-1 and 404-2 overlap vertically. The area depicted by the images 400-1 and 400-2, meanwhile, overlaps horizontally with the area depicted by the images 404-1 and 404-2.

As seen in FIG. 4A, the images 400 and 404 depict products 112 supported by the shelf module 110. In particular, as shown in FIG. 4B which shows the images 400-1, 400-2 and 404-1 in isolation (the image 404-2 is omitted because it does not depict any products 112), the images together depict products 112-1, 112-2, 112-3 and 112-4. Certain products are depicted fully in more than one image; for example, the product 112-3 is depicted in the images 400-1 and 404-1. Further, certain products 112 are depicted partially in more than one image, but may not be depicted fully in any single image. For example, the product 112-1 is depicted partially in the image 400-1 and partially in the image 404-1. As will be discussed in greater detail below, the control application 128 is configured to implement various functions to account for the repeated depiction (whether full or partial) of products 112 in the images 400 and 404 to obtain and refine product identifications.

The sets of images obtained at block 305 include a plurality of input object indicators. The input object indicators may be included as a layer of additional data in each image file, which may therefore be rendered visually as in FIG. 4B. In other examples, however, the input object indicators may be obtained at block 305 as metadata or a separate file accompanying each image 400 and 404. The input object indicators are obtained from a product recognition engine (e.g. included in the control application 128 or as a separate component of the server 101). The product recognition engine is configured to compare various image features of each image 400 and 404 to a database of product models and to select product models having image features that match those in the images. For each selected product model, the product recognition engine is configured to insert into the images or otherwise associate with the images an input object indicator. In other words, an input object indicator contains data defining a location within an image at which the product recognition engine detected a product 112, and also identify that product 112.

As seen in FIG. 4B, each image includes (i.e. contains or is otherwise associated with) a number of input object indicators 412. Specifically, the image 400-1 includes input object indicators 412a, 412b, 412c and 412d; the image 400-2 includes input object indicators 412e and 412f; and the image 404-1 includes object indicators 412g and 412h. Each input object indicator 412 defines an input bounding box, which is illustrated in dashed lines in FIG. 4B. Each input object indicator 412 also includes an object identifier. The object identifier is an identifier of the one of the above-mentioned product models selected by the product recognition engine as most matching the feature of the image within the bounding box. The object identifier may be, for example, a stock keeping unit (SKU) identification code or other suitable identifier. Each input object indicator also includes an input confidence level value, indicating a confidence assigned by the product recognition engine that the image features within the bounding box actually depict the input object identifier. Thus, for example, the input object indicator 400f indicates that the image features within the corresponding bounding box correspond to the product identifier "Y" with a confidence of 94%. The confidence values need not be expressed in percentages in other examples.

As will be apparent from FIGS. 4A and 4B, the product recognition engine may identify products 112 where none are actually depicted in the images 400 and 404. Other sources of error may also be introduced by the product recognition engine, such as selection of an incorrect object identifier, the detection of multiple objects where only one is present (e.g. as with the input object indicators 412b and 412c).

The preprocessor 200 is also configured to register the images (and therefore the associated input object indicators) obtained at block 305 to a common frame of reference, such as a coordinate system previously established within the retail facility. Such registration, as will be apparent to those skilled in the art, permits the contents of the images and input object indicators, to be compared to one another. The specific implementation of the registration to the common frame of reference is not the subject of the present disclosure, and is therefore not discussed herein; various suitable registration operations may be applied by the preprocessor 200.

Returning to FIG. 3, at block 310, the candidate detector 204 is configured to identify candidate subsets among the input object indicators obtained at block 305. More specifically, the detector 204 identifies candidate subsets in adjacent ones of each set of images. That is, with reference to the images of FIGS. 4A and 4B, candidate subsets are identified in the images 400-1 and 400-2 separately from the images 404-1 and 404-2. Indeed, the remainder of the performance of the method 300 is specific to a particular set of images unless otherwise specified below.

Each candidate subset identified at block 310 has a member in one of the images in a set, and a member in an adjacent image of the same set. The members of the candidate subset also have input bounding boxes that overlap in the common frame of reference, as well as a common object identifier. In general, the candidate subsets identified at block 310 represent objects (such as products 112) that may be only partially depicted by each individual image, but that are nevertheless fully depicted by two images together.

Figure 5:
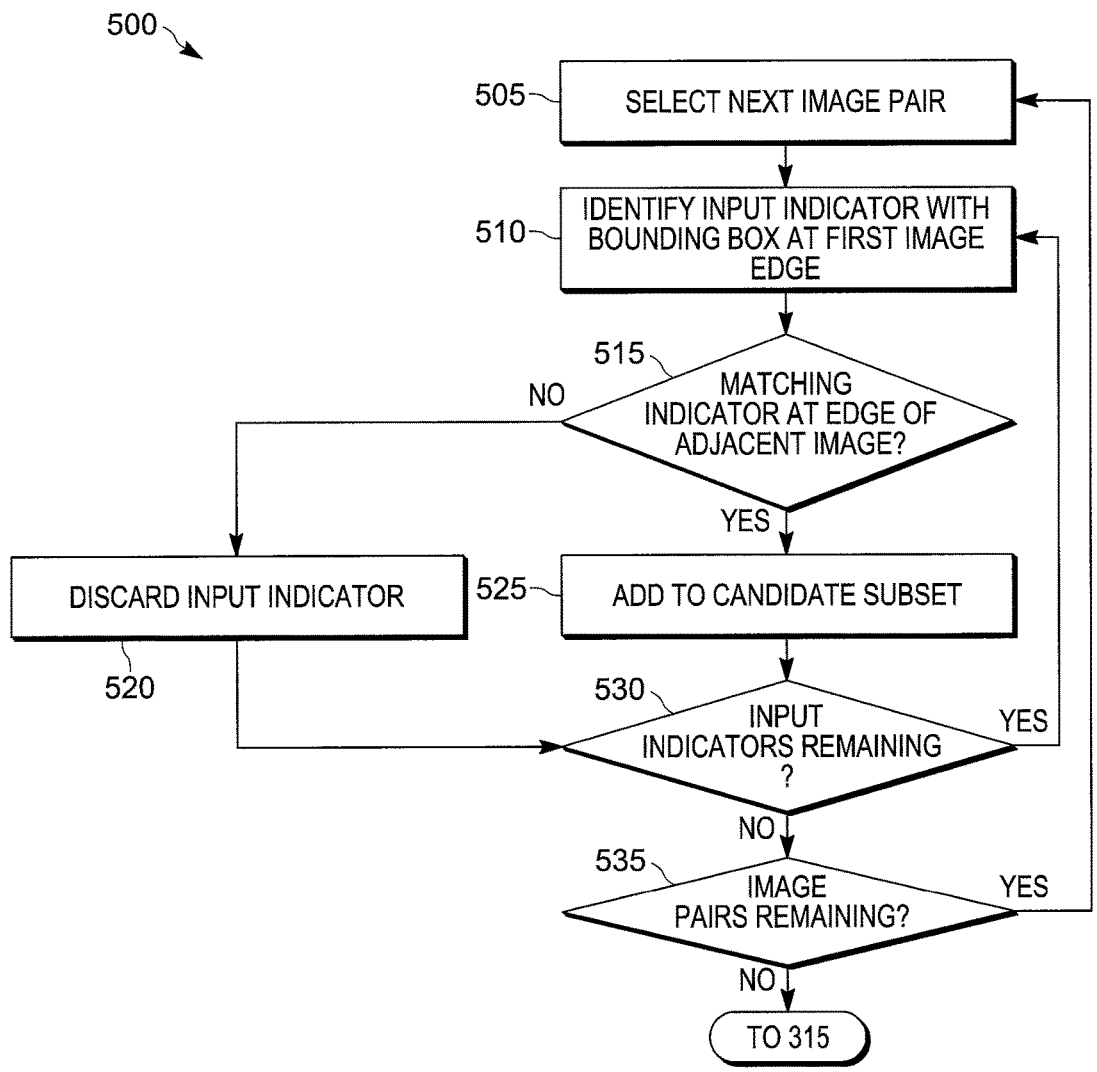
FIG. 5 depicts a method of performing block 310 of the method of FIG. 3.

Turning to FIG. 5, a method 500 of performing block 310 is shown, as performed by the detector 204. At block 505, the detector 204 is configured to select an image pair from the relevant set of images. In the present example, each set 400, 404 of images includes only one pair of images. However, in other examples each set may include a larger number of vertically-stacked images. In any event, in the present example performance of the method 500 the detector 204 is configured to select the images 400-1 and 400-2, being an adjacent pair of images in the same set.

Figure 6A:
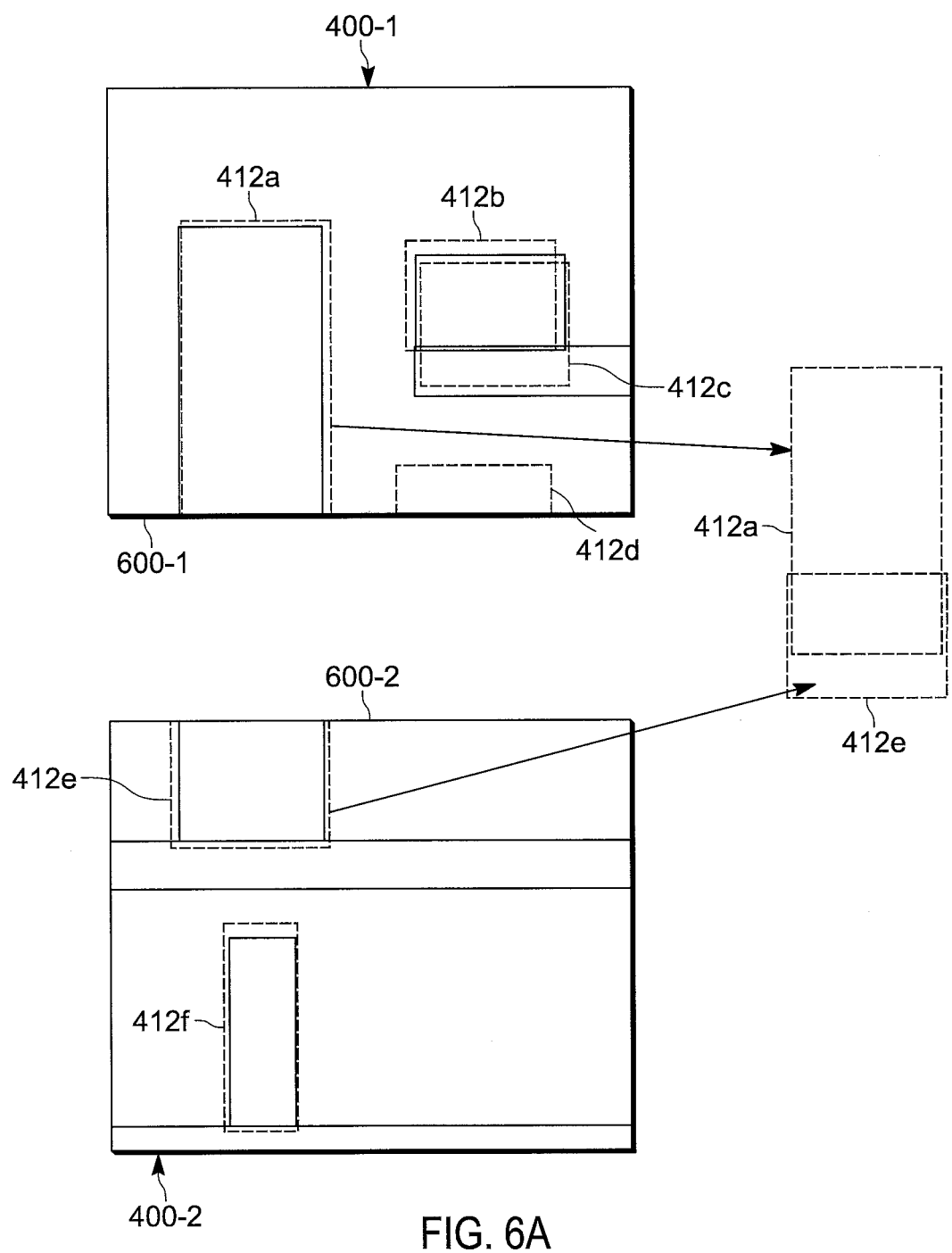
FIGS. 6A-6B depict an example of the performance of the method of FIG. 5.

At block 510, the detector 204 is configured to identify an input object indicator with a bounding box that coincides with an edge of the corresponding image, or is within a predetermined threshold distance of the edge. The edge in question is the edge of the first image in the pair selected at block 505 that is closest to the second image in the pair selected at block 505. Referring to FIG. 6A, in the present example, in which the images 400-1 and 400-2 are selected at block 505, the edge assessed at block 510 is the bottom edge 600-1 of the image 400-1.

In other words, at block 510 the detector 204 is configured to identify one of the input indicators in the image 400-1 that coincides with the edge 600-1. As will be apparent, the bounding box of input indicator 412a coincides with the edge 600-1 of the image 400-1. At block 515, the detector 204 is configured to determine whether the adjacent image (i.e., the image 400-2 in the present example) includes a matching object indicator at an edge thereof. Referring again to FIG. 6A, the detector 204 is configured to determine whether the image 400-2 contains an object indicator 412 at the edge 600-2 that matches the indicator 412a. In the context of block 510, an input object indicator 412 is considered to match another when there is at least some overlap of the respective bounding boxes of the indicators 412, and when the indicators 412 share a common object identifier. As seen in FIG. 6A, the input object indicator 412e coincides with the edge 600-2 of the image 400-2, and includes the same object identifier "V" (see FIG. 4B) as the input object indicator 412a. Further, in the common frame of reference the bounding boxes of the indicators 412a and 412e overlap, as shown in FIG. 6A. In some examples, a minimum overlap threshold may be required at block 510.

Returning to FIG. 5, when the determination at block 515 is negative, the detector 204 discards the input object indicator 412 identified at block 510. That is, the input object indicator 412 is deleted from the data obtained at block 305, and is not employed in the remainder of the processing discussed below. The input object indicator 412 is discarded at block 520 because, based on the knowledge that the images 400-1 and 400-2 overlap vertically, any object that is correctly detected at the edge of one image should also be at least partially depicted (and therefore detected by the product recognition engine) in the adjacent image. When no adjacent detection is made in the adjacent image, the detection in the first image is likely to be a false positive detection generated by the product recognition engine.

Figure 6B:
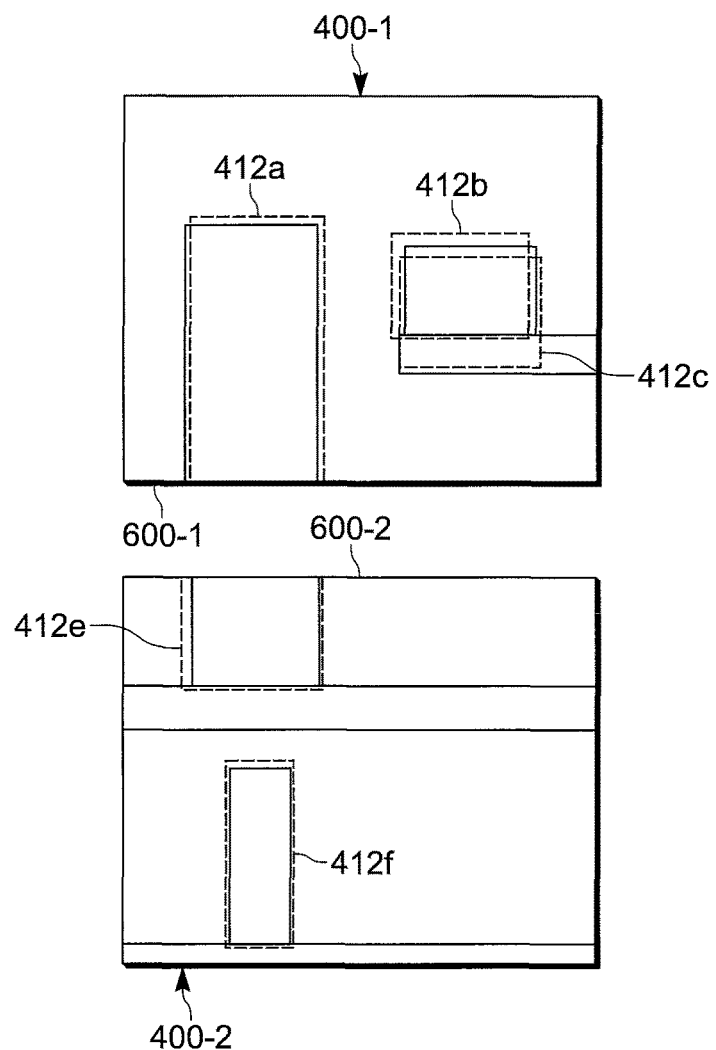

When, instead, the determination at block 515 is affirmative, as is the case with the input object indicators 412a and 412e, the detector 204 proceeds to block 525, at which the indicators 412a and 412e are added to a candidate subset. The candidate subset may be, for example, a list of identifiers of the indicators 412 for further processing as discussed below. Having added the indicators 412a and 412e, the detector 204 is configured to determine at block 530 whether further indicators 412 remain to be processed in the image 400-1. In the present example, the determination is affirmative, as the indicator 412d has not been processed. Therefore, blocks 510 and 515 are repeated for the indicator 412d. As is evident from FIG. 6A, the image 400-2 does not contain an input object indicator 412 that matches the input object indicator 412d. The indicator 412d is therefore discarded at block 520. The remaining set of input object indicators 412 after the performance of the method 500 is shown in FIG. 6B, in which the indicator 412d has been discarded.

When the determination at block 530 is negative, the detector 204 is configured to determine whether additional image pairs remain to be processed in the set. In the present example, the determination is negative. In other examples, however, the set may contain three or more images, in which case the method 500 is repeated, with the pair of images consisting of the image 400-2 and the next vertically arranged image below the image 400-2.

Returning to FIG. 3, at block 315 the candidate detector 204 is further configured to adjust the confidence level values of any candidate subsets identified at block 310. As will be apparent from FIG. 4B, the input object indicators 412 that are identified as candidate subsets will tend to correspond to products 112 that are only partially depicted in each image 400 or 404. As the product recognition engine mentioned earlier operates on each image independently, such partially depicted objects may still be detected, but assigned lower confidence level values than if they were fully depicted, as a result of certain product features being absent from each image. Thus, for example, the confidence levels for the product 112-1 are 59% and 30% in the input object indicators 412a and 412e, respectively. To reduce the likelihood of discarding the indicators 412a and 412e at a later stage under the application of a confidence level threshold, the confidence levels contained in the indicators 412a and 412e are adjusted upwards to simulate the confidence levels expected had the product 112-1 been fully depicted in each image 400.

Figure 7A:
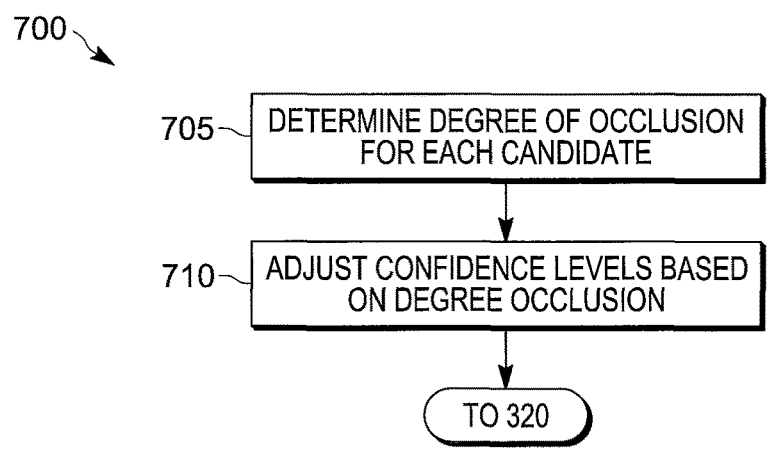
FIGS. 7A-7C depict a method of performing block 315 of the method of FIG. 3 and associated input data.
Figure 7B:
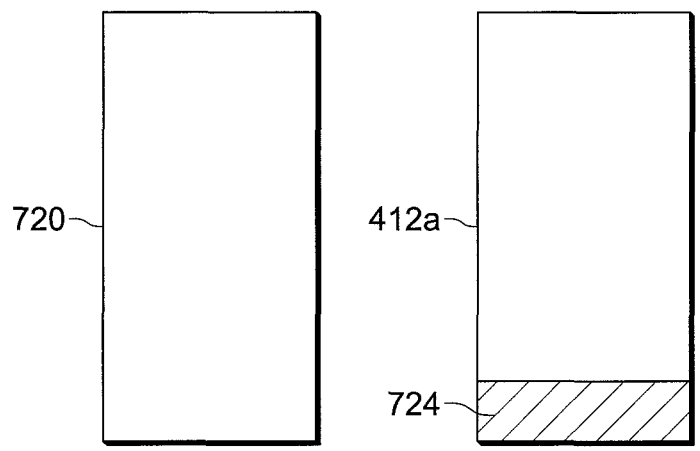

To that end, turning to FIG. 7A, the candidate detector 204 is configured to perform the method 700, in which at block 705 the detector 204 is configured to determine a degree of occlusion for each candidate in the subset via the method 500. The degree of occlusion is determined relative to reference data for the corresponding object identifier. Thus, as shown in FIG. 7B, the detector 204 is configured to retrieve a reference bounding box 720 from the repository 132, and to determine a proportion 724 of the reference bounding box that is not accounted for by the bounding box of the input object indicator 412a, which is indicative of a portion of the product "V" not being depicted in the image 400-1. Based on the area of the proportion 724 relative to the total area of the reference bounding box 720, the detector 204 is configured to adjust the confidence level value of the indicator 412a at block 710.

Figure 7C:

In the present example, referring to FIG. 7C, the adjustment at block 710 is made based on a stored relationship between degrees of occlusion and confidence levels produced by the product recognition engine. For example, a set of measurements may be obtained in which predetermined portions of a product 112 are occluded, an image of the product is captured and processed by the product recognition engine, and the resulting confidence level value is stored in conjunction with the predetermined degree of occlusion. Based on the relationship between occlusion and confidence level established by a sufficient number of such measurements, at block 710 the detector 204 can be configured to select a new confidence level value using the degree of occlusion from block 705 as input. When the degree of occlusion and the initial confidence level falls on the line of FIG. 7C, for example, the adjusted confidence level set at block 710 may be the maximum measured confidence level (e.g. about 95%, in FIG. 7C). When the degree of occlusion and the initial confidence level fall in the area underneath the line, however the detector 204 may be configured to apply a ratio to the maximum confidence level corresponding to the ratio of the initial confidence level to the expected confidence level (from the graph of FIG. 7C) based on the degree of occlusion from block 705. The performance of the method 700 is then repeated for the input object indicator 412e. As a result, the input object indicators 412a and 412e are assigned new confidence level values (e.g. 85% for the indicator 412a and 81% for the indicator 412e).

Returning to FIG. 3, at block 317 the detector 304 may also be configured to adjust the bounding boxes of the indicators 412a and 412e, for example by replacing the bounding boxes with the reference bounding box 720. In other embodiments, block 317 may be omitted.

At block 320, the cluster detector 208 is configured to select clusters of the input object indicators 412. Each cluster, as discussed in greater detail below, contains indicators 412 with confidence levels (whether the initial levels shown in FIG. 4B if no adjustments were made, or adjusted confidence levels if applicable) that satisfy a predefined minimum input confidence threshold. The input object indicators of each cluster also have a common object identifier and a degree of overlap that satisfies a predefined threshold.

Figure 8:
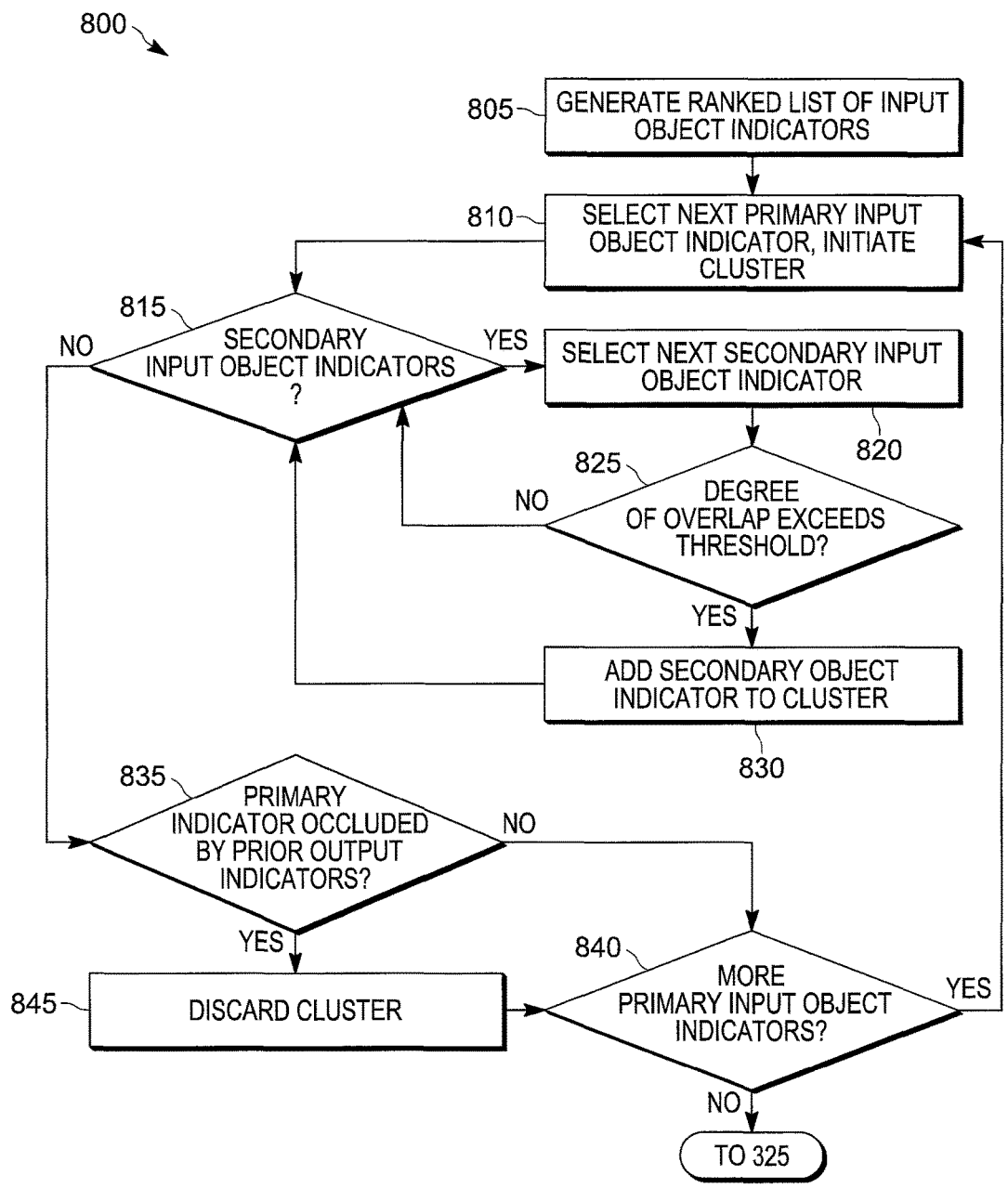
FIG. 8 depicts a method of performing block 320 of the method of FIG. 3

Turning to FIG. 8, a method 800 of cluster generation is illustrated, as performed by the cluster detector 208. As will now be apparent, the identification of candidate subsets of indicators 412 and associated removal of indicators 412 that do not form part of any candidate subsets serves to eliminate some false positive detections, while reducing the likelihood of correct detections being eliminated due to partial depiction of the underlying objects. As will be seen below, the selection of clusters and the generation of output object indicators therefrom serves to eliminate further false positives detections.

At block 805, the cluster detector 208 is configured to generate a ranked list of the input object indicators 412, as they appear following the processing steps discussed above (e.g., omitting any indicators 412 discard at block 520, and ranking indicators 412 based on adjusted confidence levels as applicable). The indicators 412 are arranged in the list generated at block 805 based on their confidence levels. Indicators having confidence levels below a predefined threshold (e.g., 65%) may also be omitted from the ranked list. Table 1, below, illustrates an example list generated at block 805 for the indicators 412 from the images 400-1 and 400-2.

TABLE 1

Ranked List of Input Object Indicators

| Indicator ID | Product ID | Confidence |
|---|---|---|
| 412f | Y | 94 |
| 412a | V | 85 |
| 412e | V | 81 |
| 412b | W | 79 |
| 412c | W | 71 |

The list generated at block 805 need not include all the information shown above, which is included primarily for illustrative purposes. Further, the list need not be generated in the tabular format shown above. At block 810, the cluster detector 208 is configured to select a primary input object indicator from the list, and to initiate a cluster with the selected primary input object indicator. The primary object indicator selected is the indicator 412 having the highest position in the list (i.e., the highest confidence level), and which has not yet been processed. Thus, in the present example performance of the method 800, the indicator 412f is selected at block 810.

At block 815, the cluster detector 208 is configured to determine whether any secondary input object indicators remain to be processed. A secondary indicator 412 is an indicator 412 in the list from block 805 that has a common object identifier with the primary object indicator selected at block 810. When the determination at block 815 is affirmative, the cluster detector 208 is configured to perform blocks 820, 825 and 830, as discussed further below. In the present example performance, however, the determination at block 815 is negative (there are no other indicators 412 containing the object identifier "Y"). The cluster detector 208 therefore proceeds to block 835, and determines whether the primary indicator is occluded beyond a predefined threshold by prior output indicators. As no output indicators have been generated, the determination is negative, and the cluster detector 208 is configured to proceed to block 840 to determine whether further primary input object indicators remain to be processed in the list generated at block 805. In the present example, the determination is affirmative, and the cluster detector 208 therefore returns to block 810, having selected a first cluster containing only the input object indicator 412f. Further processing of the clusters will be described further below in connection with block 325 of the method 300.

In the second performance of block 810, the next indicator 412 having the next highest confidence level (the indicator 412a) is selected as a primary input object indicator. At block 815, the determination is affirmative, because the indicator 412e has the same object identifier as the indicator 412a. At block 820, therefore, the cluster detector 208 is configured to select the indicator 412e as a secondary indicator. At block 825, the cluster detector 208 is configured to determine whether a degree of overlap between the primary and secondary indicators exceeds a predefined threshold. For example, the detector 208 can be configured to determine the ratio of the area of intersection between the primary and secondary indicators to the area of the union of the primary and secondary indicators, and to compare the ratio to the threshold (e.g., 70%). The degree of overlap threshold serves to indicate not only whether the primary and secondary input object indicators overlap, but also whether the overlapping area represents a sufficiently large portion of the total area covered by the bounding boxes of the primary and secondary indicators. When the determination at block 825 is negative, the secondary object indicator is not added to the cluster initiated at block 810, and the list is searched for further secondary input object indicators. When the determination at block 825 is affirmative, however, the cluster detector 208 proceeds to block 830.

In the present example performance, it is assumed that the bounding boxes of the indicators 412a and 412e were updated at block 317 to align with the reference box 720 shown in FIG. 7B. Therefore, the determination at block 825 is affirmative, and at block 830, at which the indicator 412e is added to the cluster initiated with the indicator 412a. In some examples, adding a secondary input object indicator to a cluster includes adding an identifier of the cluster to a listing of indicators 412 included in the cluster. In other examples, however, the secondary input object indicator may be added to the cluster by simply removing the secondary input object indicator from the ranked list. In such examples, the primary indicator is taken to represent both itself and the secondary indicator in the later processing discussed below.

The above process is repeated for the remaining indicators in the list of Table 1. As will now be apparent, a third cluster is generated including the indicators 412b and 412c (for example, by discarding the indicator 412c and maintaining the indicator 412b as a representative member of the cluster).

When the determination at block 840 is negative, the performance of the method 300 continues at block 325. At block 325, the output generator 212 is configured to generate a single output object indicator for each cluster selected at block 320. Thus, in the present example performance of the method 300, at block 325 the output generator generates three output object indicators, one each corresponding to the clusters represented by the input object indicators 412a, 412b and 412f. Each output object indicator includes the same object identifier as the object identifier of the cluster. Each output object indicator also includes a bounding box and confidence level derived from the cluster. In the present example, in which secondary indicators are discarded at block 830, the bounding boxes and confidence levels of the output object indicators are simply taken from the primary input object indicator of each cluster. In other examples, however, one or both of the bounding box and the confidence level of the output object indicator are derived from a combination of the primary and secondary input object indicators in the cluster. For example, an average of the primary and (one or more) secondary indicator confidence levels may be employed as the output confidence level. Further, the output bounding box may be a union or an intersection of the primary and secondary bounding boxes of the cluster.

Figure 9A:
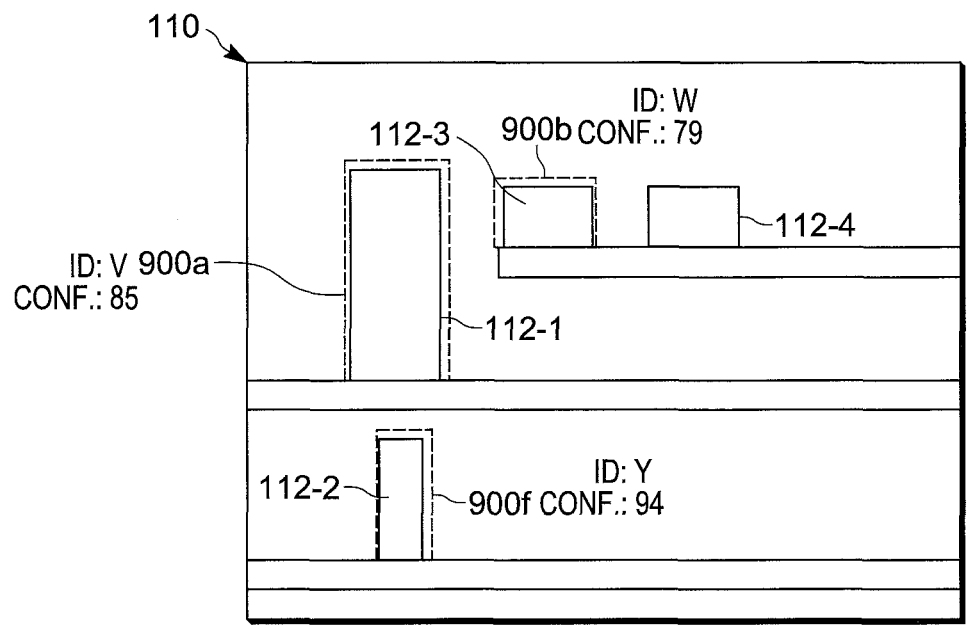
FIGS. 9A and 9B depict example results of the performance of the method of FIG. 3.

Turning to FIG. 9A, a set of three output object indicators 900a, 900b and 900f are shown, corresponding to the three clusters discussed above and illustrated overlaid on the corresponding products 112 on the shelf 110.

Following the performance of block 325, the control application 128 is configured to determine whether further sets of images remain to be processed. In the present example, the determination at block 330 is affirmative, as the images 404-1 and 404-2 have not been processed. The method 300 is therefore repeated for the images 404-1 and 404-2. Of particular note, the cluster detector 208 is configured, at block 805, to include previously generated output object indicators in the ranked list. Thus, in connection with the second performance of the method 300, the ranked list is as shown below in Table 2.

TABLE 2

Ranked List of Input Object Indicators

| Indicator ID | Product ID | Confidence |
|---|---|---|
| 900f | Y | 94 |
| 412h | Z | 91 |
| 900a | V | 85 |
| 412g | W | 82 |
| 900b | W | 79 |

As will now be apparent, traversing the method 800 for the above ranked list results in the generation of four clusters, corresponding to the indicators 900f, 412h, 900a, and 412g. Of note, the output object indicator 900b is added as a secondary object indicator to a cluster initiated with the input object indicator 412g (which has a higher confidence level than the output object indicator 900b).

At block 835, as mentioned earlier, each cluster (e.g., each primary object indicator) is evaluated for a degree of occlusion by any previous output indicators, irrespective of object identifiers. The cluster detector 208 is configured to generate a mask consisting of the union of all output object indicators (i.e., 900a, 900b and 900f in the present example), and to determine a degree (e.g., a percentage) to which the current cluster is occluded by the above-mentioned mask. For example, the degree of occlusion may be determined as the ratio of the intersection between the above mask and the area of the primary input object indicator to the area of the primary input object indicator. If the degree of occlusion exceeds a predefined threshold (e.g., 60%), then the cluster is discarded at block 845. Such a degree of occlusion indicates either a false positive detection, or a disordered shelf 110 in which the products 112 are misaligned and therefore occlude one another significantly. On the assumption that such a degree of disorder is typically rare, the cluster is discarded as being a false positive detection by the product recognition engine. In other embodiments, blocks 835 and 845 may be omitted.

Figure 9B:
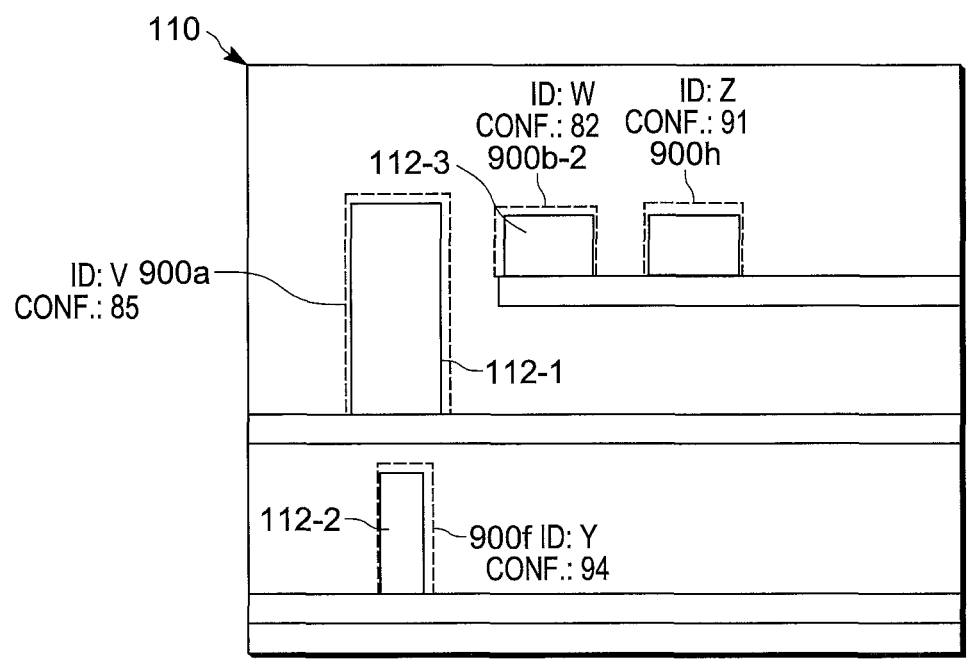

Referring to FIG. 9B, an updated set of output object indicators is illustrated, including an output object indicator 900h, and an output object indicator 900b-2, which has replaced the indicator 900b shown in FIG. 9A.

Responsive to a negative determination at block 325, the control application 128 is configured to store the output object indicators, for example in the repository 132, for rendering on a display, for further processing to derive object status information, and the like.

Variations to the above systems and methods are contemplated. For example, in some embodiments, the candidate detector 204 is configured to implement one or more validation operations at block 510. For example, the bounding boxes of the input object indicators 412 can be compared to a shelf edge location obtained by the detector 204, and any indicators 412 that overlap with the shelf edge location to a degree greater than a threshold may be discarded.

In further embodiments, the adjustment of confidence levels (block 315) as well as the adjustment of bounding boxes (block 317) may be performed simultaneously with block 525, rather than after the completion of the method 300.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of object detection in an imaging controller, comprising:
obtaining a set of images depicting overlapping regions of an area containing a plurality of objects; each of the set of images including a plurality of input object indicators defined by respective (i) input bounding boxes, (ii) input confidence level values, and (iii) object identifiers;

identifying candidate subsets of input object indicators in adjacent ones of the set of images, each candidate subset having input bounding boxes that overlap in a common frame of reference, and a common object identifier;

adjusting the input confidence level values upwards from initial values for each input object indicator in the candidate subsets;

selecting clusters of the input object indicators, the input object indicators of each cluster satisfying a minimum input confidence threshold, having a common object identifier, and having a degree of overlap that satisfies a predefined threshold; and detecting an object by generating a single output object indicator for each cluster, the output object indicator having (i) an output bounding box, (ii) an output confidence level value, and (iii) the common object identifier.

2. The method of claim 1, wherein identifying the candidate subsets includes determining whether at least two input object indicators have a degree of overlap satisfying an adjacency overlap threshold.

3. The method of claim 1, wherein the area contains a plurality of shelves supporting the objects; the set of images depicting a vertical segment of the shelves.

4. The method of claim 1, wherein adjusting the input confidence level values for each object indicator in the candidate subsets includes:

determining a degree of occlusion for each input object indicator in a candidate subset based on a comparison between the input bounding box and a reference bounding box corresponding to the object identifier of the input object indicator; and adjusting the input confidence level based on the degree of occlusion.

5. The method of claim 1, further comprising:

adjusting the input bounding boxes for each input object indicator in the candidate subsets.

6. The method of claim 5, wherein adjusting the input bounding boxes includes replacing the input bounding box for each input object in the subset with a reference bounding box corresponding to the common input object identifier.

7. The method of claim 1, wherein selecting the clusters includes:

generating a ranked list of each of the input object indicators based on the input confidence level values; and beginning at the highest-ranked input object indicator, determining a degree of overlap for successive pairs of the input bounding boxes.

8. The method of claim 7, wherein determining the degree of overlap includes determining a ratio of the intersection of each successive pair of the input bounding boxes to the union of the pair of the input bounding boxes.

9. The method of claim 7, further comprising:

obtaining a further set of images depicting overlapping regions of an adjacent area, the further set of images registered to the common frame of reference; and repeating the identifying candidate subsets, the adjusting, the selecting clusters, and the generating output object indicators, wherein generating the ranked list includes inserting the output object indicators into the ranked list.

10. A computing device for detecting objects, the computing device comprising:

a memory;

an imaging controller comprising:

an image preprocessor configured to obtain a set of images from the memory depicting overlapping regions of an area containing a plurality of objects; each of the set of images including a plurality of input object indicators defined by respective (i) input bounding boxes, (ii) input confidence level values, and (iii) object identifiers;

a subset detector configured to identify candidate subsets of input object indicators in adjacent ones of the set of images, each candidate subset having input bounding boxes that overlap in a common frame of reference, and a common object identifier;

the subset detector further configured to adjust the input confidence level values upwards from initial values for each input object indicator in the candidate subsets;

a cluster detector configured to select clusters of the input object indicators, the input object indicators of each cluster satisfying a minimum input confidence threshold, having a common object identifier, and having a degree of overlap that satisfies a predefined threshold; and an output generator configured to detect an object by generating a single output object indicator for each cluster, the output object indicator having (i) an output bounding box, (ii) an output confidence level value, and (iii) the common object identifier.

11. The computing device of claim 10, wherein the subset detector is further configured to identify the candidate subsets by determining whether at least two input object indicators have a degree of overlap satisfying an adjacency overlap threshold.

12. The computing device of claim 10, wherein the area contains a plurality of shelves supporting the objects; the set of images depicting a vertical segment of the shelves.

13. The computing device of claim 10, wherein the subset detector is further configured to adjust the input confidence level values for each object indicator in the candidate subsets by:

determining a degree of occlusion for each input object indicator in a candidate subset based on a comparison between the input bounding box and a reference bounding box corresponding to the object identifier of the input object indicator; and adjusting the input confidence level based on the degree of occlusion.

14. The computing device of claim 10, wherein the subset detector is further configured to adjust the input bounding boxes for each input object indicator in the candidate subsets.

15. The computing device of claim 14, wherein adjusting the input bounding boxes includes replacing the input bounding box for each input object in the subset with a reference bounding box corresponding to the common input object identifier.

16. The computing device of claim 10, wherein the cluster detector is configured to select the clusters by:

generating a ranked list of each of the input object indicators based on the input confidence level values; and beginning at the highest-ranked input object indicator, determining a degree of overlap for successive pairs of the input bounding boxes.

17. The computing device of claim 16, wherein the cluster detector is further configured to determine the degree of overlap by determining a ratio of the intersection of each successive pair of the input bounding boxes to the union of the pair of the input bounding boxes.

18. The computing device of claim 16, wherein the imaging controller is further configured to:
   obtain a further set of images depicting overlapping regions of an adjacent area, the further set of images registered to the common frame of reference; and
   repeat the identifying candidate subsets, the adjusting, the selecting clusters, and the generating output object indicators, wherein generating the ranked list includes inserting the output object indicators into the ranked list.

19. A non-transitory computer readable storage medium containing a plurality of computer readable instructions executable by an imaging controller to configure the imaging controller to perform a method of object detection comprising:
   obtaining a set of images depicting overlapping regions of an area containing a plurality of objects; each of the set of images including a plurality of input object indicators defined by respective (i) input bounding boxes, (ii) input confidence level values, and (iii) object identifiers;
   identifying candidate subsets of input object indicators in adjacent ones of the set of images, each candidate subset having input bounding boxes that overlap in a common frame of reference, and a common object identifier;
   adjusting the input confidence level values upwards from initial values for each input object indicator in the candidate subsets;
   selecting clusters of the input object indicators, the input object indicators of each cluster satisfying a minimum input confidence threshold, having a common object identifier, and having a degree of overlap that satisfies a predefined threshold; and
   detecting an object by generating a single output object indicator for each cluster, the output object indicator having (i) an output bounding box, (ii) an output confidence level value, and (iii) the common object identifier.

* * * * *